INFORMATION STORAGE AND TRANSFER STRUCTURE

Filed July 8, 1959 6 Sheets-Sheet 1

INVENTOR.
Edward Rogal
BY Morse & Altman
ATTORNEYS

INVENTOR.
Edward Rogal
BY
Morse & Altman
ATTORNEYS

Oct. 30, 1962 E. ROGAL 3,061,819

INFORMATION STORAGE AND TRANSFER STRUCTURE

Filed July 8, 1959 6 Sheets-Sheet 3

INVENTOR.

Edward Rogal

BY

Morse & Altman

ATTORNEYS

INVENTOR.
Edward Rogal
BY
Morse & Altman
ATTORNEYS

INVENTOR.
Edward Rogal

BY Morse & Altman

ATTORNEYS

Oct. 30, 1962 E. ROGAL 3,061,819

INFORMATION STORAGE AND TRANSFER STRUCTURE

Filed July 8, 1959 6 Sheets-Sheet 6

INVENTOR.
Edward Rogal
BY
Morse & Altman
ATTORNEYS

United States Patent Office 3,061,819
Patented Oct. 30, 1962

3,061,819
INFORMATION STORAGE AND TRANSFER STRUCTURE

Edward Rogal, Scituate, Mass., assignor to Universal Controls, Inc., New York, N.Y., a corporation of Maryland Filed July 8, 1959, Ser. No. 825,825
6 Claims. (Cl. 340—173)

The present invention relates to the storage and transfer of information and, more particularly, to a construction in the form of a matrix of geometrically positioned elements that may be caused to assume different mechanical states for the purpose of representing bits of information. Such a structure, for example, may comprise an array of solenoids that may be selectively energized to represent a field of information. However, in the case of a large field having many columns of several rows, the large number of solenoids required may result in undue complexity and expense. This complexity and expense may be multiplied seriously in systems incorporating several such matrices interconnected in various ways.

The object of the present invention is to provide a novel matrix that is unusually simple and inexpensive by virtue of a minimization of the number of solenoids. The construction is in the form of a plurality of intersecting members, which are actuated by relatively few solenoids, and a plurality of interposed elements at the junctions of the intersecting members, which interposed elements undergo useful mechanical movement when designated by selected intersecting members. Such a matrix is useful for storing and transferring coded frequencies representing selected information and for actuating printing, punching devices, etc. A plurality of such matrices may be employed as interrelated components of a data transfer and storage system.

Other objects of the present invention will in part be obvious and will in part appear hereinafter.

The invention accordingly comprises components and systems possessing the construction, combination of elements and arrangement of parts, which are exemplified in the following detailed description, and the scope of which will be indicated in the claims.

For a fuller understanding of the nature and objects of the present invention, reference should be had to the following detailed description, taken in connection with the accompanying drawings, wherein.

Figure 1:
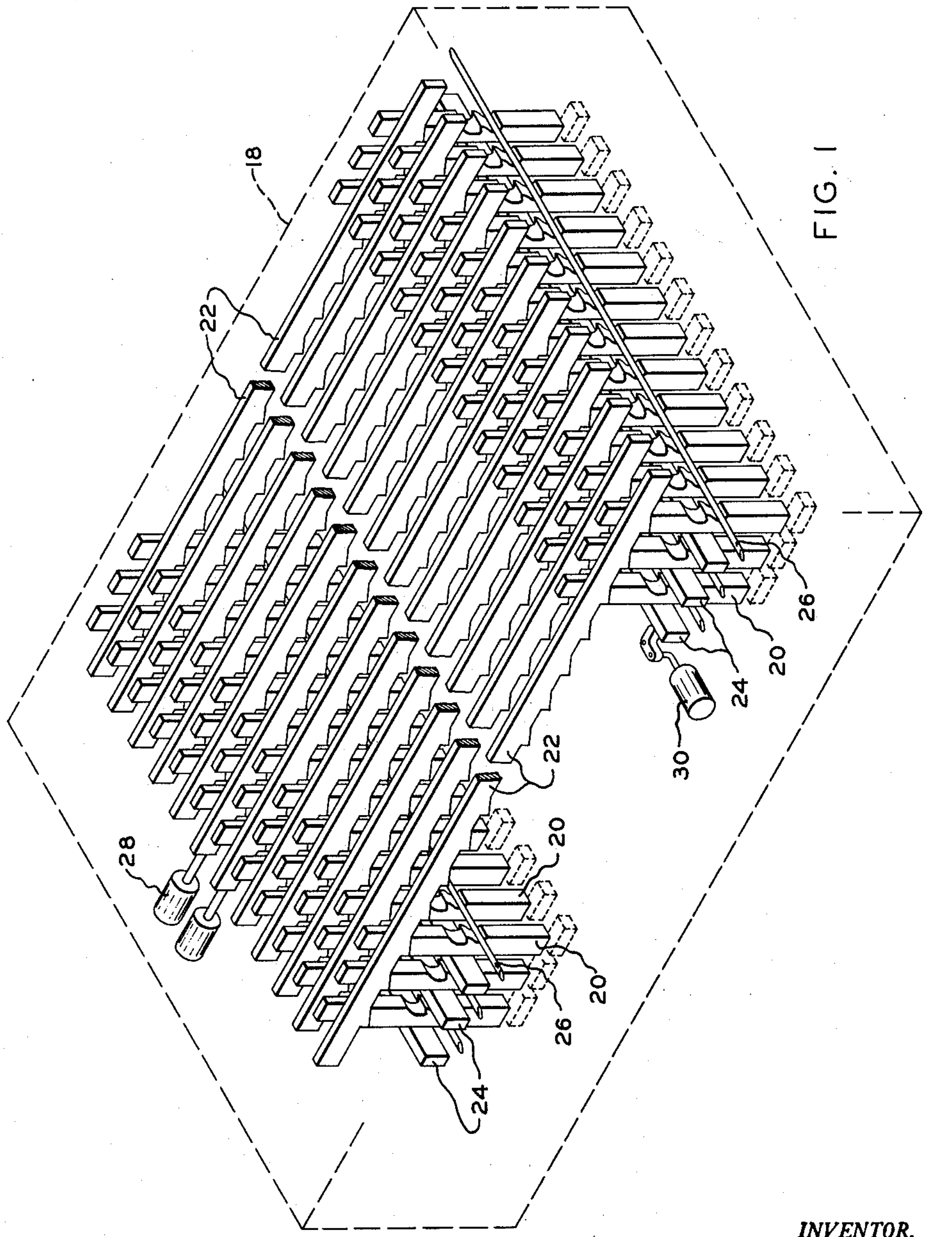
FIG. 1 is an isometric view of a matrix embodying the present invention.

Generally the illustrated embodiment of the present invention, as shown in FIG. 1, is designed to selectively designate various positions in a field of order (vertical)

columns (in this case forty) and character (horizontal) rows (in this case thirteen). At these positions are mechanical elements that may be actuated and deactuated in a manner to be described in detail below. It is apparent that actuating any particular one of these mechanical elements may serve the purpose of storing information designated by a particular character in a particular column. Such mechanical elements are capable of actuating automatically analogus positions on the setup matrix of a calculator, a printer, a punch or the like. These mechanical elements are disposed at the intersections of two perpendicularly disposed arrays of parallel elongated members, of which the members of one array are disposed along the various order columns and the members of the other array are disposed at the intersections of two perpendicularly disposed arrays of parallel elongated members, of which the members of one array are disposed along the various order columns and the members of the other array are disposed along the various character rows. The order column members, the character row members and the interposed elements are so interconnected that when any given order column member and any given character row member are actuated, the given interposed element at their intersection will be actuated and locked. The construction permits several interposed elements in the same order column and/or in the same character row to be locked at one time.

As shown in FIGS. 1 to 5, the illustrated matrix comprises, mounted within a housing 18: a plurality of interposed elements 20 that generally are vertically disposed, as observed in FIG. 1; a plurality of character row members 22, disposed generally in a first plane, to which interposed elements 20 are perpendicular; a plurality of order column members 24, disposed generally in a second plane, to which interposed elements 20 are perpendicular; and a plurality of control members 26 for locking elements 20 in actuated condition and releasing elements 20 from actuating condition in a manner to be described below. The first plane of character row members 22 is disposed above the second plane of order members 24. Interposed elements 20 are disposed at the intersections of the character row members and the order column members as they are viewed from above in superposed relation. The various character row members, order column members and control members are remotely actuated by solenoids 28, 30 and 32 (FIGS. 1 and 2), with which they are respectively associated.

Figure 2:
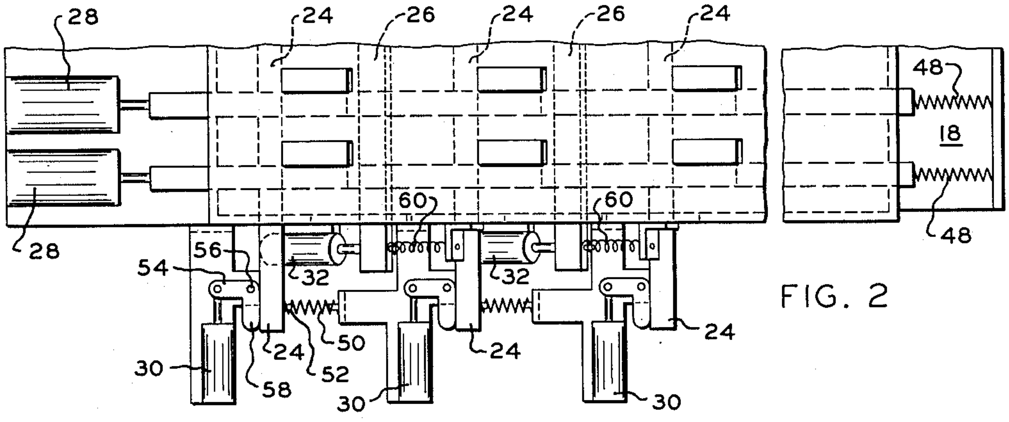
FIG. 2 is a fragmentary plan view of the matrix of FIG. 1.
Figure 3:
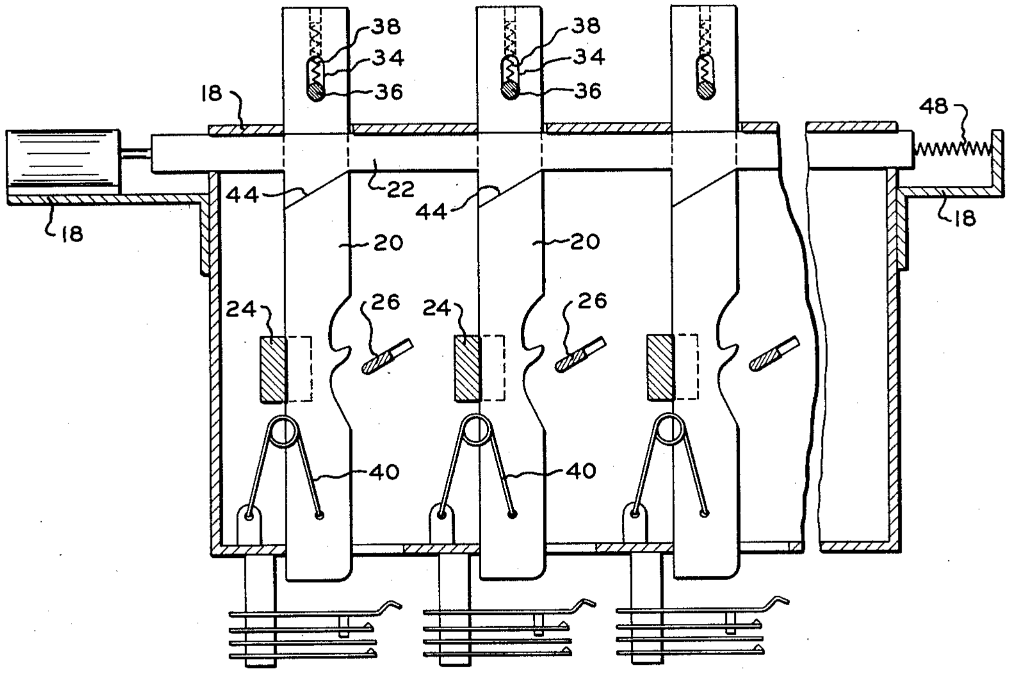
FIG. 3 is a fragmentary elevation view of the matrix of FIG. 1; with some parts shown in section.
Figure 4:
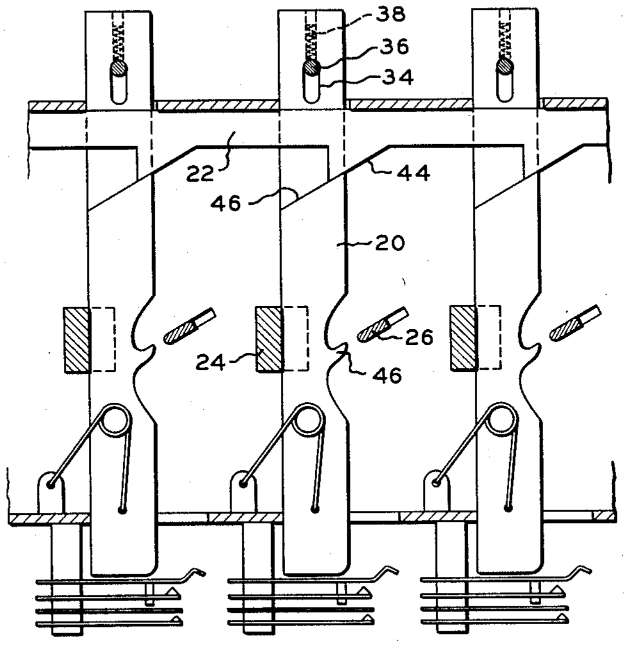
FIG. 4 is analogous to FIG. 3, showing a first step in a sequence of operation.
Figure 5:
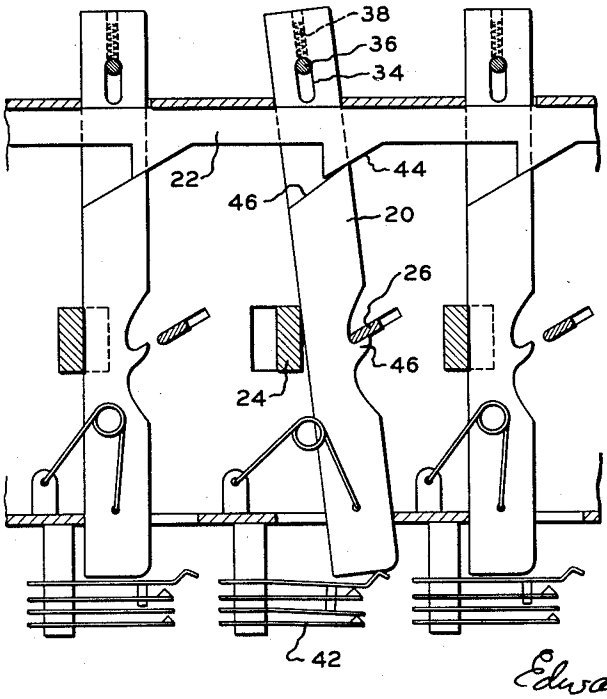
FIG. 5 is analogous to FIG. 3, showing a second step in the sequence of operation.

Details of the structure and operation of interposed elements 20, character row members 22 and order column members 26 are illustrated in FIGS. 2, 3, 4 and 5. Each of interposed elements 20 is slidably and pivotably mounted with respect to housing 18 by a slot 34, through which projects a rod 36. The opposite ends of rod 36 are affixed to housing 18. Normally, the lower extremity of slot 34 is urged into abutment against rod 36 by a suitable helical spring 38. Normally, interposed element 20 is in its uppermost position, as observed in FIG. 3. Also interposed element 20 is urged by a hair spring 40 into an extreme clockwise position, as observed in FIG. 3, against its associated order column member 24. Intersecting character row member 22 and order column member 24, when actuated, cooperated with an associated control member 26 to lock an interposed element 20 in its lowermost position, as viewed in FIG. 5. In this position, interposed element 20 is capable of closing a switch 42 for any desired purpose. It will be observed that each of character row members 22 is provided with a series of cam surfaces 44. Cam surfaces 44 are in association with corresponding cam surfaces 46 provided by associated interposed elements 20. When a designated member 22 is actuated, a cam surface 44 bears against a cam surface 46 to cause an interposed element 20 to move downwardly, as shown in FIG. 4. At this point, rod 36 is at the upper extremity of slot 34. Thereupon, a designated order column member 24 is actuated to cause the interposed element 20 to pivot about rod 36 and to cause a catch 46 to engage a control member 26. Now, when designated members 22 and 24 are deactuated, only the designated interposed element 20 at their intersection remains actuated. Control member 26, at any time thereafter, may be deactuated in order to release any interposed elements 20 designated in the foregoing way.

As shown in FIG. 2 and 3, solenoids 28, which are mounted on housing 18 and connected to the rearward ends of character column members 22, are associated with compression springs 48, which extend from the forward ends of members 22 to housing 18. The opposite ends of order column members 24 are spring pressed into deactuated position by compression springs 50, which are guided by suitable pins 52. The opposite ends of order column members 24 are urged into actuated position by bell cranks. For clarity, only the bell crank at one of the opposite ends of each order column member 24 is shown, as at 54. Each bell crank 54 is pivoted as at 56 and bears against the order column member as at 58. Solenoids 32, which when energized actuate control members 26, do so against the opposing bias of compression springs 60.

Figure 6:
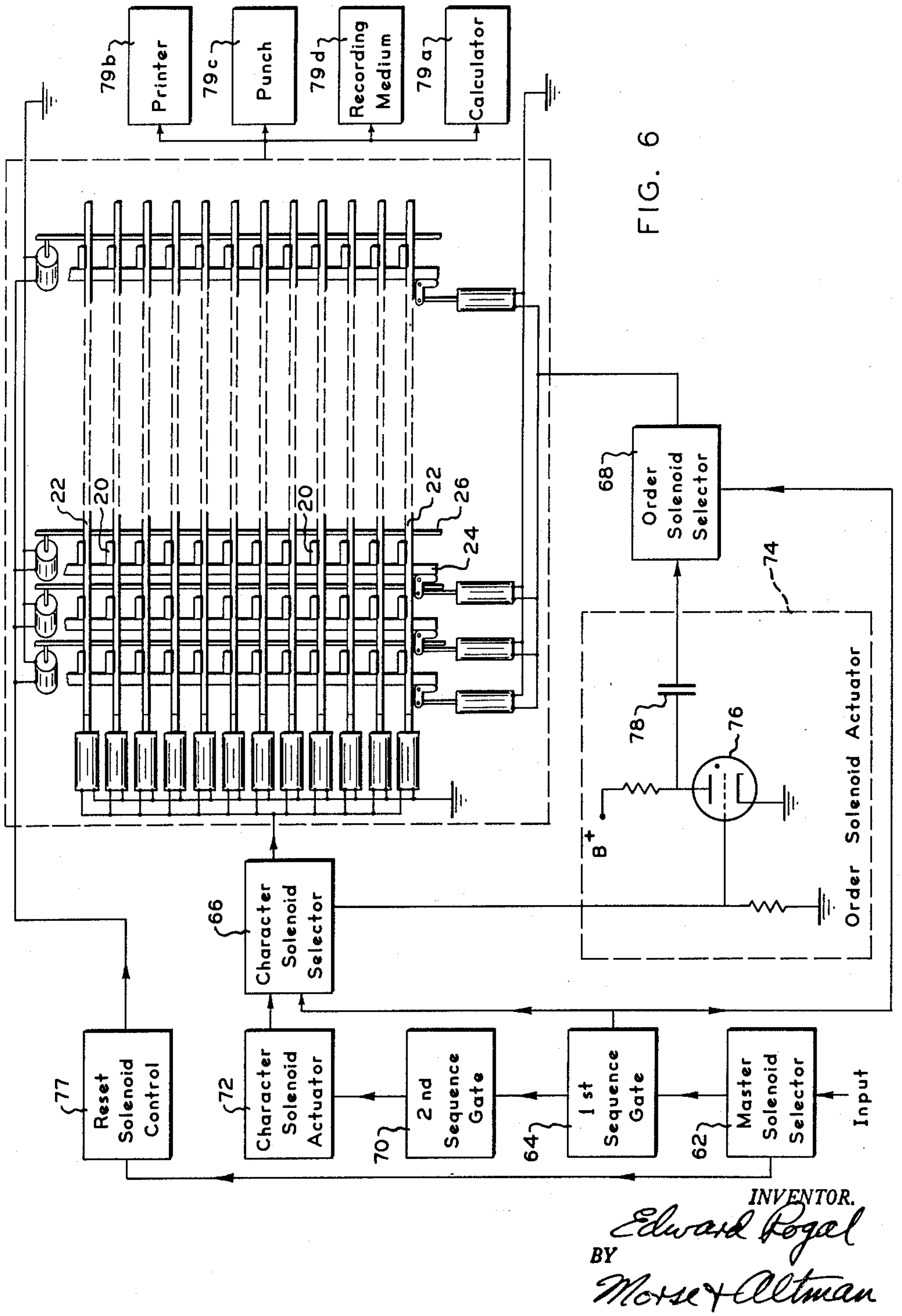
FIG. 6 is a diagrammatic illustration of electrical and mechanical details of a system for controlling the matrix of FIG. 1.
Figure 7:
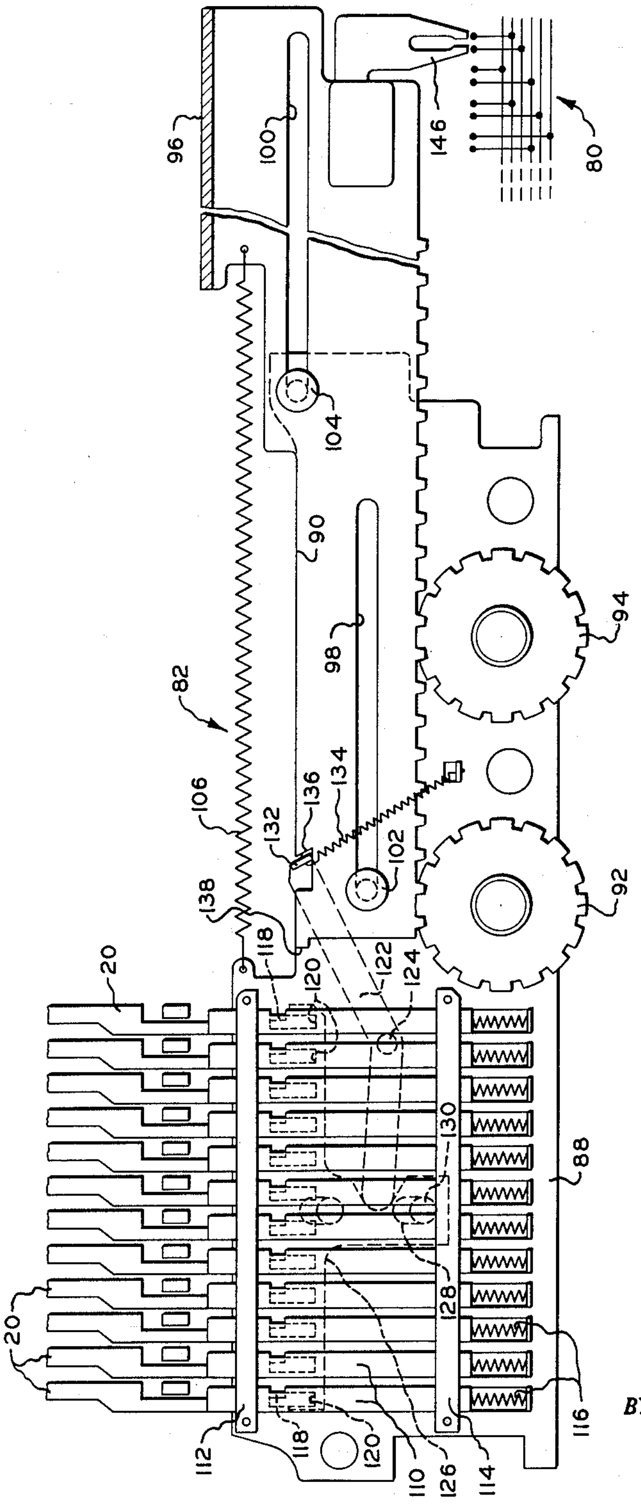
FIG. 7 is a detail view of a component of the system of FIG. 6.

The control system of FIG. 6 is designed to cause the the sequential actuation of character row members 22 and order column members 24 to occur virtually simultaneously. This system, in response to an input signal designating a particular pair of intersecting character row members 22 and order column members 24, and consequently a particular interposed element 20, operates first to actuate a designated character row member 22 and thereafter to release a previously stored charge in order to actuate a designated order column member 24 with sufficient power to preclude undue delay. The input signal to the system of FIG. 6 is applied first to a suitable master solenoid selector circuit 62, which controls the subsequent overall sequence of operation. In response, master solenoids selector circuit 62 applies an appropriate signal to a first sequence gate 64, which in turn sets up but does not operate a character row solenoid selector circuit 66 and an order column solenoid selector circuit 68. Thereafter, a second sequence gate 70 operates a character row solenoid actuator circuit 72 in order to operate the particular character row member 22 previously designated by selector circuit 66. Also, character row solenoid actuator circuit 72 causes selector circuit 66 to apply a positive pulse to an order column solenoid actuator circuit 74. Actuator circuit 74 includes a thyratron stage 76, in the plate loop of which is a storage capacitor 78. Following the operation of master solenoid selector circuit 62 and during the operation of first sequence gate 64, second sequence gate 70, actuator circuit 72, selector circuit 66 and selector circuit 68, capacitor 78 charges from B+. However, when the positive pulse from selector circuit 66 is applied to the grid of thyratron stage 73, a large surge of current is applied by capacitor 78 through thyratron stage 76 to ground and, in consequence, the particular solenoid associated with the designated order column member 24 is energized for high speed operation. The various interposed elements 20, when set up serially in the foregoing way, mechanically designate electrical switches and mechanical elements of any calculators 79*a*, printers 79*b*, punches 79*c*, or physical recording media 79*d*, i.e. magnetic or electrolytic, that may be desired. The interrelationships among interposed elements 20 and electrical switches and mechanical elements of the foregoing type are shown in FIGS. 7 and 8.

Figure 8:
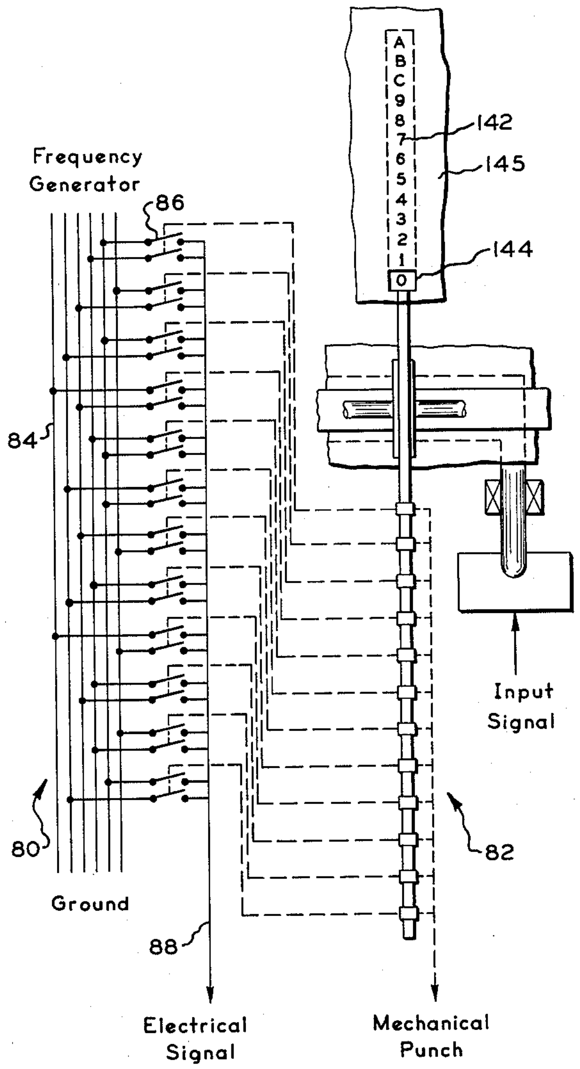
FIG. 8 is a detail view of the component of FIG. 7 in association with another component of the system of FIG. 6.
Figure 9:
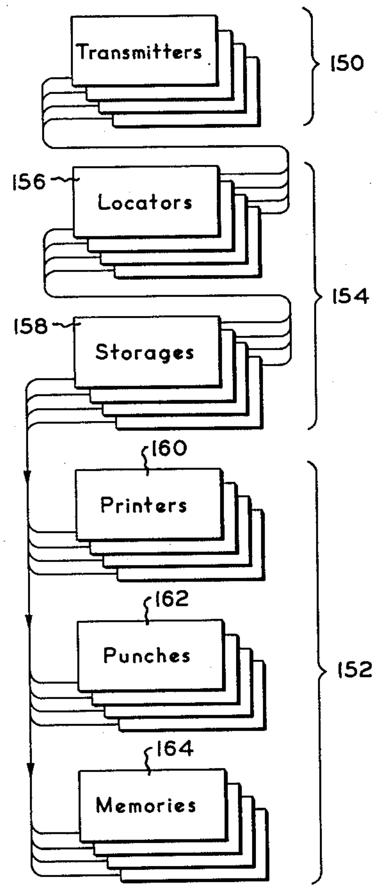
FIG. 9 is a block diagram of a system comprising a plurality of the matrices of FIG. 1, interrelated to perform an automatic data processing function.

In FIG. 8 there are disclosed fragments of an electrical switching circuit 80 and a mechanical selecting mechanism 82 of types that are useful in accordance with the present invention. For clarity, only one channel of the switching circuit and one channel of the selecting mechanism are shown, each being associated with the interposers of one order column of the matrix of FIG. 1. Switching circuit 80 is designed to transfer its information in the form of selected combinations of frequency chords or tones. It is apparent that ten digits may be represented as ten different combinations of two out of six frequencies. In other words, any individual digit from 0 to 9 of a first decimal column or order of a multi-digit number or field may be represented by a code of two out of six frequencies, any individual digit from 0 to 9 of a second decimal column or order may be represented by a code of two out of six other frequencies, etc. The two out of six frequencies representing the first decimal order, the two out of six frequencies representing the second decimal order, etc. all may be combined for transmission at one time while retaining their identities for separation by suitable discriminating circuits. It has been found that a six digit field preferably is represented by twelve out of thirty-six frequencies. The illustrated switching circuit is shown as producing a pair of discrete chords is selected from a group of six frequencies, each supplied by a suitable frequency generator to a bus 84. A column of switches 86 is associated with bus 84. Each switch of column 86, when actuated, applies to an output bus 88, a unique combination of two out of six frequencies. Thus one interposed element 20 is capable of actuating one switch of column 86 in order to permit a unique signal to be transmitted.

Printing mechanism 82, which is actuated mechanically by an element 20*a* associated with a selected interposed element 20, produces a designated printed record. As shown in FIG. 7, printing component 82 includes a stationary mounting plate 88 and mounted thereupon, a reciprocal slide rack 90, a rotatable wheel 92 that is driven by slide rack 90, an indicator plate 96 that is carried by slide rack 90, and a suitable reset solenoid assembly (not shown). Rotatable with print wheel 92 is an auxiliary print wheel 94 for printing in a second position when desirable. The longitudinal position of slide rack 90 and consequently, the rotational position of print wheels 92 and 94 and the longitudinal position of indicator plate 96 are controlled as follows: Slide rack 90 is provided with a pair of parallel longitudinal slots 98 and 100 through which a pair of guide pins 102 and 104 extend from mounting plate 88. Normally slide rack 90 is returned to the illustrated extreme position (with pins 102 and 104 in abutment against the inner ends of slots 98 and 100) by the reset assembly against the reverse bias of a spring 106. Slide rack 90 is associated with an order column of interposed elements 20 that control the operation of slide rack 90. In response to appropriate actuation by a particular character row member 22 and a particular order column member 24, one of thirteen interposed elements 20 is actuated. Interposed elements 20 are operatively connected to slide links 110, which are vertically reciprocal under the constraint of a pair of guides 112 and 114. Slide links 110 normally are urged into their uppermost positions by compression springs 116, which are operatively disposed between slide links 120 and mounting plate 88. Slide links 110 are provided with rearwardly projecting lugs 118, which project through openings 120 in mounting plate 88. Mounted on the rearward face of mounting plate 88 are a crank-latch 122, which is pivoted at 124 and latch release slide 126, which is vertically reciprocal under the constraint of slots 128 in slide 126 and pins 130 projecting from mounting plate 88. It will be observed that one end of crank-latch 122 is engaged by a release slide 126 and the other end is provided with a lug 132 which is biased by a spring 134 into a notch 136 in slide rack 90. The arrangement is such when one of the interposed elements 20 is actuated, the lug 118 of one of slide links 110 engages latch release slide 126. In consequence, latch release slide 126 is moved downwardly, crank latch 122 is pivoted so that lug 132 is withdrawn from notch 136 and slide rack 90 is directed to the left until its advance edge 138 abuts against the particular lug 118 that is engaging release slide 126. All other lugs 118 are spaced from the path of travel of advance edge 138. In this position, slide rack 90 causes print wheels 92 and 94 to rotate to a position at which a particular increment 140 bearing one or more numerals or other characters is in printing position that causes indicator plate 96 to advance to a position at which a corresponding increment 142 bearing corresponding numerals or other characters underlies a window 144 in a housing 145. As shown, slide rack 90 carries an insulated contact 146 which may constitute a part of a switch network similar to the switch network shown at 80. When electrical and mechanical components 80 and 82 have been set up, they may be operated by a suitable signal from reset solenoid control 77 of FIG. 6.

The construction of FIGS. 1 through 9 is variously useful in a system of the type described in patent application Serial No. 784,913, filed by Edward Rogal on January 5, 1959, for Central Office Memory Recording System. The foregoing system as shown generally in FIG. 9, as applied to a department store accounting and operating system, comprises a plurality of transmitters 150 for transmitting signals representing transaction data from a plurality of transaction sites, an arrangement 152 of media for selectively receiving records representing accounting entries related to the transaction data in response to the signals; and a director 154 for transmitting signals from appropriate transmitters to the multiplicity of media designated by the signals. Transmitters 150 are located throughout the many areas and rooms of the department store and/or department store branches. Media 152 and director 154 are located at one or a few locations in the department store, one or more of its branches or elsewhere.

Transmitters 150 serve: to transmit transaction data from various department store purchasing offices etc. and to produce corresponding printed orders etc.; to transmit transaction data from the various department store receiving platforms and to produce corresponding routing labels, coded and uncoded tags, etc.; to transmit transaction data from the plurality of the department store disbursing offices, etc. and to produce corresponding checks, drafts etc.; and to transmit all types of customer transaction data from the various department store customer transaction counters and to produce corresponding sales slips, payment on account slips, etc. Director 154 includes: electromagnetic switching units 156 for locating an operating transmitter at which a transaction is in process and electro-magnetic converting units 158 for temporarily storing a record in response to signals representing information of this transaction. Media 152 includes printers 160, punches 162 and memories 164, which are operatively connected directly to converting units 158.

Since certain changes may be made in the above system without departing from the scope of the invention herein involved, it is intended that all matter contained in the above description or shown in the accompanying drawings shall be interpreted in an illustrative and not in a limiting sense.

What is claimed is:

1. An electromechanical storing and actuating device comprising a base, a first series of elongated substantially parallel column members reciprocably constrained on said base for motion between actuated and deactuated positions substantially in the direction of their elongation, a second series of elongated substantially parallel row members reciprocably constrained on said base for motion between actuated and deactuated positions substantially in the direction of their elongation, said column members and said row members being oriented substantially perpendicularly with respect to each other in order to provide a plurality of intersections, a plurality of elongated interposed members at said intersections reciprocably constrained on said base for motion between actuated and deactuated positions substantially in the direction of their elongation, said direction of said elongation of said interposed members being perpendicular to said direction of elongation of said column members and of said row members, said plurality of elongated interposed members being provided with elongated slots, the direction of elongation of said slots being substantially parallel to said direction of elongation of said interposed members, shafts on said base projecting through said slots, resilient means urging first extremities of said slots toward said shafts, said interposed members being provided with first cam elements, said column members being provided with second cam elements, said first cam elements engaging said second cam elements when said column members are in actuated position in order to move said interposed members into actuated position against said bias of said resilient means, said row members engaging said interposed members when said row members are in actuated position, a plurality of first catch elements on said base movable between locking and releasing positions, said interposed members having second catch elements pivotable with said interposed members about said shafts between actuated and deactuated positions, said first catch elements and said second catch elements becoming interlocked when simultaneously said interposed members are in actuated positions, said first catch elements are in locking positions and said second catch elements are in actuated positions, said first catch elements becoming freed when said first catch elements are in releasing positions, whereby movement of a particular column member into actuated position and movement of a particular row member into actuated position cause a particular interposed member to be locked in actuated position and movement of a particular second catch element into releasing position causes said particular interposed member to return to deactuated position.

2. The device of claim 1 wherein said interposed elements are operatively connected to electrical switches.

3. The device of claim 1 wherein said interposed elements are operatively connected to mechanical actuators.

4. An electromechanical storing and actuating device comprising a base, a first series of elongated substantially parallel column members reciprocably constrained on said base for motion between actuated and deactuated positions substantially in the direction of their elongation, a second series of elongated substantially parallel row members reciprocably constrained on said base for motion between actuated and deactuated positions substantially in the direction of their elongation, said column members and said row members being oriented substantially perpendicularly with respect to each other in order to provide a plurality of intersections, a plurality of elongated interposed members at said intersections reciprocably constrained on said base for motion between actuated and deactuated positions substantially in the direction of their elongation, said direction of said elongation of said interposed members being perpendicular to said direction of elongation of said column members and of said row members, said plurality of elongated interposed members being provided with elongated slots, the direction of elongation of said slots being substantially parallel to said direction of elongation of said interposed members, shafts on said base projecting through said slots, resilient means urging first extremities of said slots toward said shafts, said interposed members being provided with first cam elements, said column members being provided with second cam elements, said first cam elements engaging said second cam elements when said column members are in actuated position in order to move said interposed members into actuated position against said bias of said resilient means, said row members engaging said interposed members when said row members are in actuated position, a plurality of first catch elements on said base movable between locking and releasing positions, said interposed members having second catch elements pivotable with said interposed members about said shafts between actuated and deactuated positions, said first catch elements and said second catch elements becoming interlocked when simultaneously said interposed members are in actuated positions, said first catch elements are in locking positions and said second catch elements are in actuated positions and said first catch elements becoming freed when said first catch elements are in releasing positions, whereby movement of a particular column member into actuated position and movement of a particular row member into actuated position cause a particular interposed member to be locked in actuated position and movement of a particular second catch element into releasing position causes said particular interposed member to return to deactuated position, first solenoid means for actuating selected ones of said column members, second solenoid means for actuating selected ones of said row members, and auxiliary means responsive to said first solenoid means and applied to said second solenoid means, said auxiliary means including an electron valve stage having a storage capacitor in its power circuit and a control electrode operatively connected to said first solenoid means.

5. A storing and actuating device comprising a base, a first series of elongated substantially parallel first control members reciprocably constrained on said base for motion between actuated and deactuated positions substantially in the direction of their elongation, a second series of elongated substantially parallel second members reciprocably constrained on said base for motion between actuated and deactuated positions substantially in the direction of their elongation, said first control members and said second control members being oriented substantially perpendicularly with respect to each other in order to provide a plurality of intersections, a plurality of elongated interposed members at said intersections reciprocably constrained on said base for motion between actuated and deactuated positions substantially in the direction of their elongation, said direction of said elongation of said interposed members being perpendicular to said direction of elongation of said first control members and of said second control members, a plurality of constraining means on said base, said plurality of elongated interposed members being slidable and pivotable by said constraining means resilient means urging said plurality of interposed members into said actuated positions, said interposed members being provided with first cam elements, said column members being provided with said second cam elements, said first cam elements engaging said second cam elements when said column members are in actuated position in order to move said interposed members into actuated position against said bias of said resilient means, said row members being operatively connected to said interposed members when said row members are in actuated position, a plurality of first catch elements on said base movable between locking and releasing positions, said interposed members having second catch elements pivotable with said interposed members between actuated and deactuated positions, said first catch elements and said second catch elements becoming interlocked when simultaneously said interposed members are in actuated positions, said first catch elements are in locking positions and said second catch elements are in actuated positions, said first catch elements becoming freed when said first catch elements are in releasing positions, whereby movement of a particular column member into actuated position and movement of a particular row member into actuated position cause a particular interposed member to be locked in actuated position and movement of a particular second catch element into releasing position causes said particular interposed member to return to deactuated position.

6. The storing and actuating device of claim 5 wherein said first cam elements have first surfaces that are oblique with respect to the direction of elongation of said first control members and said second cam elements have second surfaces that are oblique with respect to said interposed members, said first surfaces and said second surfaces being slidable in contact with each other.

References Cited in the file of this patent

UNITED STATES PATENTS

| | | |
|---|---|---|
| 367,332 | Baxter | July 26, 1887 |
| 2,399,962 | Vincent | May 7, 1946 |
| 2,866,176 | Durfee et al. | Dec. 23, 1958 |
| 2,867,790 | Durfee et al. | Jan. 6, 1959 |